(12) United States Patent
Roddy et al.

(10) Patent No.: US 7,036,586 B2
(45) Date of Patent: May 2, 2006

(54) METHODS OF CEMENTING IN SUBTERRANEAN FORMATIONS USING CRACK RESISTANT CEMENT COMPOSITIONS

(75) Inventors: Craig W. Roddy, Duncan, OK (US); Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 158 days.

(21) Appl. No.: 10/769,490

(22) Filed: Jan. 30, 2004

(65) Prior Publication Data

US 2005/0167107 A1 Aug. 4, 2005

(51) Int. Cl.
  *E21B 33/14* (2006.01)
(52) U.S. Cl. ............ 166/277; 166/292; 166/293; 106/805; 106/810; 106/823
(58) Field of Classification Search ............ 166/207, 166/277, 285, 291, 292, 293; 106/802, 805, 106/810, 823
See application file for complete search history.

(56) References Cited

U.S. PATENT DOCUMENTS

| | | |
|---|---|---|
| 2,238,671 A | 4/1941 | Woodhouse |
| 2,703,316 A | 3/1955 | Schneider |
| 3,784,585 A | 1/1974 | Schmitt et al. |
| 3,828,854 A | 8/1974 | Templeton et al. |
| 3,868,998 A | 3/1975 | Lybarger et al. |
| 3,912,692 A | 10/1975 | Casey et al. |
| 3,958,638 A | 5/1976 | Johnston |
| 3,960,736 A | 6/1976 | Free et al. |
| 4,169,798 A | 10/1979 | DeMartino |
| 4,202,795 A | 5/1980 | Burnham et al. |
| 4,304,298 A | 12/1981 | Sutton |
| 4,340,427 A | 7/1982 | Sutton |
| 4,367,093 A | 1/1983 | Burkhalter et al. |
| 4,387,769 A | 6/1983 | Erbstoesser et al. |
| 4,450,010 A | 5/1984 | Burkhalter et al. |
| 4,461,644 A | 7/1984 | Childs et al. |
| 4,470,915 A | 9/1984 | Conway |
| 4,506,734 A | 3/1985 | Nolte |
| 4,526,695 A | 7/1985 | Erbstorsser et al. |
| 4,565,578 A | 1/1986 | Sutton et al. |
| 4,650,520 A | 3/1987 | Johnsen et al. |
| 4,715,967 A | 12/1987 | Bellis et al. |
| 4,716,964 A | 1/1988 | Erbstoesser et al. |
| 4,741,401 A | 5/1988 | Walles et al. |
| 4,769,077 A | 9/1988 | Crocker |
| 4,770,796 A | 9/1988 | Jacobs |
| 4,809,783 A | 3/1989 | Hollenbeck et al. |
| 4,817,721 A | 4/1989 | Pober |
| 4,843,118 A | 6/1989 | Lai et al. |
| 4,848,467 A | 7/1989 | Cantu et al. |
| 4,957,165 A | 9/1990 | Cantu et al. |
| 4,961,466 A | 10/1990 | Himes et al. |
| 4,961,790 A | 10/1990 | Smith et al. |
| 4,986,353 A | 1/1991 | Clark et al. |
| 4,986,354 A | 1/1991 | Cantu et al. |
| 4,986,355 A | 1/1991 | Casad et al. |
| 5,082,056 A | 1/1992 | Tackett, Jr. |
| 5,086,850 A | 2/1992 | Harris et al. |
| 5,121,795 A | 6/1992 | Ewert et al. |
| 5,123,487 A | 6/1992 | Harris et al. |
| 5,127,473 A | 7/1992 | Harris et al. |
| 5,142,023 A | 8/1992 | Gruber et al. |
| 5,178,219 A | 1/1993 | Streich et al. |
| 5,203,629 A | 4/1993 | Valle et al. |
| 5,216,050 A | 6/1993 | Sinclair |
| 5,234,497 A | 8/1993 | Crocker |
| 5,238,064 A | 8/1993 | Dahl et al. |
| 5,247,059 A | 9/1993 | Gruber et al. |
| 5,320,851 A | 6/1994 | de Mars et al. |
| 5,359,026 A | 10/1994 | Gruber |
| 5,373,901 A | 12/1994 | Norman et al. |
| 5,437,331 A | 8/1995 | Gupta et al. |
| 5,439,055 A | 8/1995 | Card et al. |
| 5,460,226 A | 10/1995 | Lawson et al. |
| 5,475,080 A | 12/1995 | Gruber et al. |
| 5,484,881 A | 1/1996 | Gruber et al. |
| 5,536,807 A | 7/1996 | Gruber et al. |
| 5,588,488 A | 12/1996 | Vijn et al. |

(Continued)

FOREIGN PATENT DOCUMENTS

EP   0 879 935 A3   10/1999

(Continued)

OTHER PUBLICATIONS

Halliburton brochure entitled "Super CBL Additive Cement Additive" dated 1999.

(Continued)

*Primary Examiner*—George Suchfield
(74) *Attorney, Agent, or Firm*—Craig W. Roddy; Baker Botts L.L.P.

(57) ABSTRACT

The present invention relates to subterranean cementing operations, and more particularly, to methods of cementing in subterranean formations using cement compositions that autogenously cure voids that may form in such cement compositions. In one embodiment, the present invention provides a method of cementing in a subterranean formation penetrated by a well bore comprising the steps of: placing a cement composition into the well bore, wherein the cement composition comprises a first cementitious component having a first set time and a second cementitious component having a second set time that is delayed relative to the first set time of the first cementitious component; allowing the first cementitious component to at least partially set; and allowing the second cementitious component to set after a delay period.

78 Claims, No Drawings

U.S. PATENT DOCUMENTS

| | | |
|---|---|---|
| 5,591,700 A | 1/1997 | Harris et al. |
| 5,594,095 A | 1/1997 | Gruber et al. |
| 5,604,186 A | 2/1997 | Hunt et al. |
| 5,669,456 A | 9/1997 | Audibert et al. |
| 5,728,209 A | 3/1998 | Bury et al. |
| 5,849,401 A | 12/1998 | El-Afandi et al. |
| 5,911,923 A | 6/1999 | Work et al. |
| 5,922,652 A | 7/1999 | Kowalski et al. |
| 6,131,661 A | 10/2000 | Conner et al. |
| 6,135,208 A | 10/2000 | Gano et al. |
| 6,143,698 A | 11/2000 | Murphey et al. |
| 6,162,766 A | 12/2000 | Muir et al. |
| 6,189,615 B1 | 2/2001 | Sydansk |
| 6,207,620 B1 | 3/2001 | Gonzalez et al. |
| 6,209,646 B1 | 4/2001 | Reddy et al. |
| 6,225,262 B1 | 5/2001 | Irwin et al. |
| 6,242,390 B1 | 6/2001 | Mitchell et al. |
| 6,279,656 B1 | 8/2001 | Sinclair et al. |
| 6,308,777 B1 | 10/2001 | Chatterji et al. |
| 6,323,307 B1 | 11/2001 | Bigg et al. |
| 6,326,458 B1 | 12/2001 | Gruber et al. |
| 6,357,527 B1 | 3/2002 | Norman et al. |
| 6,387,986 B1 | 5/2002 | Moradi-Araghi et al. |
| 6,409,175 B1 | 6/2002 | Evans et al. |
| 6,444,316 B1 | 9/2002 | Reddy et al. |
| 6,457,524 B1 | 10/2002 | Roddy |
| 6,485,947 B1 | 11/2002 | Rajgarhia et al. |
| 6,508,305 B1 | 1/2003 | Brannon et al. |
| 6,527,051 B1 | 3/2003 | Reddy et al. |
| 6,554,071 B1 | 4/2003 | Reddy et al. |
| 6,561,271 B1 | 5/2003 | Baugh et al. |
| 6,565,644 B1 | 5/2003 | Kepler et al. |
| 6,599,863 B1 | 7/2003 | Palmer et al. |
| 6,645,288 B1 | 11/2003 | Dargaud et al. |
| 6,648,962 B1 | 11/2003 | Berke et al. |
| 6,655,475 B1 | 12/2003 | Wald |
| 6,668,928 B1 | 12/2003 | Brothers |
| 6,669,771 B1 | 12/2003 | Tokiwa et al. |
| 6,689,208 B1 | 2/2004 | Brothers |
| 6,702,022 B1 | 3/2004 | Kattsyn et al. |
| 6,702,023 B1 | 3/2004 | Harris et al. |
| 6,710,019 B1 | 3/2004 | Sawdon et al. |
| 6,710,107 B1 | 3/2004 | Audibert et al. |
| 6,763,888 B1 | 7/2004 | Harris et al. |
| 6,817,414 B1 | 11/2004 | Lee |
| 2001/0016562 A1 | 8/2001 | Muir et al. |
| 2002/0004464 A1 | 1/2002 | Nelson et al. |
| 2002/0036088 A1 | 3/2002 | Todd |
| 2002/0147113 A1 | 10/2002 | Green |
| 2002/0185274 A1* | 12/2002 | Simpson et al. ............ 166/277 |
| 2002/0193257 A1 | 12/2002 | Lee et al. |
| 2003/0000425 A1 | 1/2003 | Kepler et al. |
| 2003/0060374 A1 | 3/2003 | Cooke, Jr. |
| 2003/0114314 A1 | 6/2003 | Ballard et al. |
| 2003/0116319 A1 | 6/2003 | Brothers et al. |
| 2003/0121659 A1 | 7/2003 | Brothers |
| 2003/0130133 A1 | 7/2003 | Vallmer |
| 2003/0134751 A1 | 7/2003 | Lee et al. |
| 2003/0234103 A1 | 12/2003 | Lee et al. |
| 2003/0236171 A1 | 12/2003 | Nguyen et al. |
| 2004/0014607 A1 | 1/2004 | Sinclair et al. |
| 2004/0040706 A1 | 3/2004 | Hossaini et al. |
| 2004/0043906 A1 | 3/2004 | Heath et al. |
| 2004/0063588 A1 | 4/2004 | Rose et al. |
| 2004/0094300 A1 | 5/2004 | Sullivan et al. |
| 2004/0110645 A1 | 6/2004 | Campbell |
| 2004/0138068 A1 | 7/2004 | Rimmer et al. |
| 2004/0152601 A1 | 8/2004 | Still et al. |
| 2004/0231845 A1 | 11/2004 | Cooke, Jr. |
| 2004/0261993 A1 | 12/2004 | Nguyen |
| 2004/0261995 A1 | 12/2004 | Nguyen et al. |
| 2004/0261996 A1 | 12/2004 | Munoz, Jr. et al. |
| 2004/0261999 A1 | 12/2004 | Nguyen |
| 2005/0028976 A1 | 2/2005 | Nguyen |
| 2005/0034861 A1 | 2/2005 | Saini et al. |
| 2005/0034865 A1 | 2/2005 | Todd et al. |
| 2005/0034868 A1 | 2/2005 | Frost et al. |
| 2005/0103496 A1 | 5/2005 | Todd et al. |
| 2005/0252659 A1 | 11/2005 | Sullivan et al. |

FOREIGN PATENT DOCUMENTS

| | | |
|---|---|---|
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 00/49272 | 8/2000 |
| WO | WO 01/04520 A1 | 1/2001 |
| WO | WO 01/04535 A1 | 1/2001 |
| WO | WO 02/012674 | 2/2002 |
| WO | WO 02/053867 A2 | 7/2002 |
| WO | WO 02/066783 A1 | 8/2002 |
| WO | WO 02/068792 A1 | 9/2002 |
| WO | WO 03/004819 A2 | 1/2003 |
| WO | WO 03/004820 A2 | 1/2003 |
| WO | WO 03/023179 A2 | 3/2003 |
| WO | WO 03/027431 A2 | 4/2003 |
| WO | WO 03/027431 A3 | 4/2003 |
| WO | WO 03/029607 A1 | 4/2003 |
| WO | WO 03/042486 A2 | 5/2003 |
| WO | WO 2004/001188 A1 | 12/2003 |
| WO | WO 04/037946 A1 | 5/2004 |
| WO | WO 04/038176 A1 | 5/2004 |
| WO | WO 2004/037946 A1 | 5/2004 |
| WO | WO 2004/038176 A1 | 5/2004 |

OTHER PUBLICATIONS

Halliburton brochure entitled "MicroBond M Cement Additive" dated 1999.

Halliburton brochure entitled "MicroBond HT Cement Additive" dated 1999.

Halliburton brochure entitled "MicroBond Expanding Additive for Cement" dated 1999.

Paper entitled "Poly(phenyllactide): Synthesis, Characterization, and Hydrolytic Degradation" by Tara L. Simmons et al., dated 2001.

Paper entitled "Synthesis and Properties of Polymers Derived from Substituted Lactic Acids" by Mao Tin et al., dated 2001.

Paper entitled "Macromolecules" by Mao Yin et al., dated 1999.

Paper entitled "Advanced in Polymer Science" by Professor Akihiro Abe et al. dated 2002, pp. 1-138.

Yin, et al., "Preparation and Characterization of Substituted Polylactides," Am. Chem. Soc., vol. 32, No. 23, 1999 (pp. 7711-7718).

Cantu, et al, "Laboratory and Field Evaluation of a Combined Fluid-Loss-Control Additive and Gel Breaker for Fracturing Fluids," SPE Paper 18211 (1990).

Foreign communication from a related counterpart application dated May 2, 2005.

Todd, Brad et al., "A Chemical 'Trigger' Useful for Oilfield Applications" dated 2005, SPE 92709.

Cordes, E.H. et al., "Mechanism and Catalysis for Hydrolysis of Acetals, Ketals and Ortho Esters" dated 1973.

U.S. Appl. No. 10/650,101, filed Aug. 26, 2003, Todd et al.

U.S. Appl. No. 10/655,883, filed Sep. 5, 2003, Nguyen.

U.S. Appl. No. 10/661,173, filed Sep. 11, 2003, Todd et al.
U.S. Appl. No. 10/664,126, filed Sep. 17, 2003, Todd et al.
U.S. Appl. No. 10/736,152, filed Dec. 15, 2003, Todd.
U.S. Appl. No. 10/765,334, filed Jan. 27, 2004, Todd et al.
U.S. Appl. No. 10/768,323, filed Jan. 30, 2004, Roddy et al.
U.S. Appl. No. 10/768,864, filed Jan. 30, 2004, Roddy et al.

* cited by examiner

METHODS OF CEMENTING IN SUBTERRANEAN FORMATIONS USING CRACK RESISTANT CEMENT COMPOSITIONS

BACKGROUND OF THE INVENTION

The present invention relates to subterranean cementing operations, and more particularly, to methods of cementing in subterranean formations using cement compositions that autogenously cure voids that may form in such cement compositions.

Hydraulic cement compositions are commonly used in subterranean operations, particularly subterranean well completion and remedial operations. For example, hydraulic cement compositions are used in primary cementing operations whereby pipe strings, such as casings and liners, are cemented in well bores. In performing primary cementing, hydraulic cement compositions are pumped into the annular space between the walls of a well bore and the exterior surface of the pipe string disposed therein. The cement composition is permitted to set in the annular space, thereby forming an annular sheath of hardened, substantially impermeable cement therein that substantially supports and positions the pipe string in the well bore and bonds the exterior surfaces of the pipe string to the walls of the well bore. Hydraulic cement compositions also are used in remedial cementing operations such as plugging highly permeable zones or fractures in well bores, plugging cracks and holes in pipe strings, and the like.

Once the cement sets, voids may be present in the resultant set cement sheath. These voids may result from a number of possible causes, such as from the occurrence of a chemical reaction during hydration, from stresses imparted onto the cement composition caused by subterranean operations, and/or from stress exerted by the environment. For example, where hydration occurs too rapidly, voids may result. Voids may form from pipe movements, pipe expansions, impacts, and/or shocks generated by drilling and other subterranean operations, that may occur simultaneously with the setting of the composition. In one instance, voids may form during subterranean operations from the use of expandable tubulars, such as pipes, pipe strings, casings, liners, and the like.

Voids in set cement sheaths are generally undesirable, inter alia, because they may lead to loss of zonal isolation, which may allow formation fluids to enter the well bore and/or well bore fluids to enter the formation. In an attempt to counteract this problem, various additives (e.g., fibers and/or expansion additives) have been added to cement compositions. However, such techniques may not prevent the formation of voids and thus can lead to a loss of zonal isolation.

SUMMARY OF THE INVENTION

The present invention relates to subterranean cementing operations, and more particularly, to methods of cementing in subterranean formations using cement compositions that autogenously cure voids that may form in such cement compositions.

In one embodiment, the present invention provides a method of cementing in a subterranean formation penetrated by a well bore comprising the steps of: placing a cement composition into the well bore, wherein the cement composition comprises a first cementitious component having a first set time and a second cementitious component having a second set time that is delayed relative to the first set time of the first cementitious component; allowing the first cementitious component to at least partially set; and allowing the second cementitious component to set after a delay period.

In other embodiments, the present invention provides a method of cementing in a subterranean formation penetrated by a well bore comprising the steps of: placing a cement composition into the well bore, wherein the cement composition comprises a first cementitious component having a first set time and a second cementitious component comprising microencapsulated cement particles, wherein the second cementitious component has a second set time that is delayed relative to the first set time of the first cementitious component; allowing the first cementitious component to at least partially set; and allowing the second cementitious component to set after a delay period.

In other embodiments, the present invention provides a method of cementing an expandable tubular in a subterranean formation penetrated by a well bore comprising the steps of: placing the expandable tubular into the well bore; placing a cement composition into the well bore wherein the cement composition comprises a first cementitious component having a first set time and a second cementitious component having a second set time that is delayed relative to the first set time of the first cementitious component; allowing the first cementitious component to at least partially set; expanding the expandable tubular; and allowing the second cementitious component to set after a delay period.

In other embodiments, the present invention provides a method of cementing an expandable tubular in a subterranean formation penetrated by a well bore comprising the steps of: placing the expandable tubular into the well bore; placing a cement composition into the well bore wherein the cement composition comprises a first cementitious component having a first set time and a second cementitious component comprising microencapsulated cement particles, wherein the second cementitious component has a second set time that is delayed relative to the first set time of the first cementitious component; allowing the first cementitious component to at least partially set; expanding the expandable tubular; and allowing the second cementitious component to set after a delay period.

The features and advantages of the present invention will be readily apparent to those skilled in the art upon a reading of the description of the preferred embodiments, which follows.

DESCRIPTION OF EXEMPLARY EMBODIMENTS

The present invention relates to subterranean cementing operations, and more particularly, to methods of cementing in subterranean formations using cement compositions that autogenously cure voids that may form in such cement compositions. As used herein, the phrase "cure voids" refers to the ability of the cement compositions of the present invention to fill, partially fill, and/or obstruct at least one void that may form in such cement compositions.

The cement compositions used in the methods of the present invention generally comprise water, a first cementitious component having a first set time, and a second cementitious component having a second set time that is delayed relative to the set time of the first cementitious component. It is understood that the cement compositions of the present invention may be foamed or unfoamed or may comprise other means to reduce their densities. Other additives suitable for use in subterranean well bore cementing operations also may be added to these cement compositions as desired. A cement composition useful in the methods of the present invention is described in U.S. Pat. No. 6,565,644, the disclosure of which is incorporated herein by reference.

The water present in the cement compositions of the present invention can be fresh water, salt water (e.g., water containing one or more salts dissolved therein), brine (e.g., saturated salt water), or seawater. Generally, the water can be from any source, provided that it does not contain an excess of compounds, e.g., dissolved organics, that may adversely affect other components in the cement composition. The water may be present in an amount sufficient to form a pumpable slurry. Generally, the water is present in the cement compositions in an amount in the range of from about 25% to about 180% by weight of the cement ("bwoc") therein.

Any hydraulic cement that is suitable for use in subterranean applications may be suitable for use as the first cementitious component. A variety of hydraulic cements are suitable for use, including those comprised of calcium, aluminum, silicon, oxygen, and/or sulfur, which set and harden by reaction with water. Such hydraulic cements include, but are not limited to, Portland cements, pozzolanic cements, gypsum cements, high alumina content cements, silica cements, soil cements, calcium phosphate cements, high alkalinity cements, and mixtures thereof.

In an exemplary embodiment, at least one void may form during the setting of the first cementitious component. Voids may form during the setting of the first cementitious component, inter alia, from the occurrence of a chemical reaction during hydration, from stresses imparted onto the cement composition caused by subterranean operations, and/or from stresses exerted by the environment. In an exemplary embodiment, at least one void is due to at least the use of an expandable tubular.

Generally, the second cementitious component of the cement compositions of the present invention may be any suitable cement having a set time that is delayed relative to the set time of the first cementitious component. For example, in one embodiment, the second cementitious component will not begin to hydrate until after a delay period. In an exemplary embodiment, the delay period is at least a few hours to a few days after the bulk (e.g., at least over one half thereof) of the first cementitious component has hydrated. Among other things, the delayed set of the second cementitious component may cure at least one void that may form during the setting of the first cementitious component.

In an exemplary embodiment, the second cementitious component may comprise microencapsulated cement particles designed so as to be time-released, thereby delaying the set of such microencapsulated cement particles for a delay period. The microencapsulated cement particles present in the cement compositions, in certain embodiments, may comprise any hydraulic cement that is suitable for use in subterranean applications. A variety of hydraulic cements are suitable for use including those comprised of calcium, aluminum, silicon, oxygen, and/or sulfur, which set and harden by reaction with water. Such hydraulic cements include, but are not limited to, Portland cements, pozzolanic cements, gypsum cements, high alumina content cements, silica cements, soil cements, calcium phosphate cements, high alkalinity cements, and mixtures thereof. Further, in an exemplary embodiment, the hydraulic cement may be an expansive hydraulic cement. A suitable expansive hydraulic cement is described in U.S. Pat. No. 6,457,524, the disclosure of which is incorporated herein by reference.

Further, the microencapsulated cement particles may comprise conventional particle size cement, fine particle size cement, ultra-fine particle size cement, or mixtures thereof. In an exemplary embodiment, the microencapsulated cement particles may comprise an ultra-fine particle size cement having particle diameters not greater than about 30 microns, preferably not greater than about 17 microns, and still more preferably not greater than about 11 microns. Ultra-fine particle size cement generally has a particle size distribution where 90% percent of the particles have a diameter not greater than about 25 microns, preferably not greater than about 10 microns, and more preferably not greater than about 4 microns; and 20 percent of the particles have a diameter not greater than about 5 microns, preferably not greater than about 3 microns, and more preferably not greater than about 2 microns. Suitable examples of ultra-fine particle size cement are described in U.S. Pat. Nos. 5,086,850; 5,121,795; 5,123,487; 5,127,473; and 5,238,064, the relevant disclosures of which are incorporated herein by reference. An example of a suitable ultra-fine particle size cement is "MICRO MATRIX®" cement, which is commercially available from Halliburton Energy Services, Duncan, Okla.

The microencapsulated cement particles may be prepared, in certain embodiments, using any suitable encapsulation methodology, whereby the microencapsulated cement particles may be released into the cement composition after a delay period. Generally, the microencapsulation of the second cementitious component involves at least one coating of a degradable material. Exemplary encapsulation methodologies are described further in U.S. Pat. Nos. 5,604,186; 6,357,527; 6,444,316; 6,527,051; and 6,554,071, the relevant disclosures of which are incorporated herein by reference. One of ordinary skill in the art, with the benefit of this disclosure, will recognize the appropriate encapsulation methodology to use for a chosen application.

The coating applied to the microencapsulated cement particles in certain embodiments may be selected from a number of different suitable degradable materials capable of preventing incorporation of the microencapsulated cement particles into the cement composition until after a desired delay period. In an exemplary embodiment, the coating should not substantially degrade for at least six hours in a high pH environment.

It is understood that when degradable materials are used as a coating as described herein, such degradable materials are capable of undergoing an irreversible degradation downhole. The term "irreversible" as used herein means that the degradable material, once degraded downhole, should not recrystallize or reconsolidate while downhole, e.g., the degradable material should degrade in situ but should not recrystallize or reconsolidate in situ. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of, inter alia, a chemical or thermal reaction or a reaction induced by radiation.

In an exemplary embodiment, the degradable material comprises a degradable polymeric material. One should be mindful that the degradability of a polymer depends at least in part on its backbone structure. The physical properties of degradable polymeric materials depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, elongational viscosity with tension-stiffening behavior. The properties of the coating utilized can be further tailored by blending, and copolymerizing it with another polymer, or by a change in the macromolecular architecture (e.g., hyper-branched polymers, star-shaped, or dendrimers, etc.). The properties of any such suitable degradable polymeric materials (e.g., hydrophobicity, hydrophilicity, rate of degradation, etc.) can be tailored by introducing select functional groups along the polymer chains. For example, poly(phenyllactide) will degrade at about ⅕th of the rate of racemic poly(lactide) at a pH of 7.4 at 55° C. One of ordinary skill in the art with the benefit of this disclosure will be able to determine the appropriate degradable polymeric material to achieve the desired physical properties of the coating.

Suitable examples of degradable materials that may be used in accordance with the present invention include but are not limited to those described in the publication of Advances in Polymer Science, Vol. 157 entitled "Degradable Aliphatic Polyesters" edited by A.-C. Albertsson, pages 1–138. Specific examples include homopolymers, random, block, graft, and star- and hyper-branched aliphatic polyesters. Polycondensation reactions, ring-opening polymerizations, free radical polymerizations, anionic polymerizations, carbocationic polymerizations, coordinative ring-opening polymerization, and any other suitable process may prepare such suitable polymers. Specific examples of suitable degradable materials include polysaccharides such as dextrans or celluloses; chitins; chitosans; liquid esters (e.g., triethyl citrate); proteins (e.g., gelatin); aliphatic polyesters; poly(lactides); poly(glycolides); poly(ε-caprolactones); poly(hydroxybutyrates); poly(anhydrides); aliphatic polycarbonates; ortho esters, poly(orthoesters); poly(amino acids); poly(ethylene oxides); and polyphosphazenes.

In choosing the appropriate degradable material, one should consider the degradation products that will result. These degradation products should not adversely affect other operations or components. The choice of degradable material also can depend, at least in part, on the conditions of the well, e.g., wellbore temperature. For instance, lactides have been found to be suitable for lower temperature wells, including those within the range of 60° F. to 150° F., and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Also, in some embodiments, it is desirable for the degradable material to degrade slowly over time as opposed to instantaneously.

Generally, the coating should release the microencapsulated cement particles to become incorporated within the cement composition after a desired delay period so that the set time of the second cementitious component is delayed relative to the set time of the first cementitious component. In at least one embodiment, the microencapsulation should prevent the microencapsulated cement particles from hydrating until they come into contact with water after their release from encapsulation. When the microencapsulated cement particles are released from encapsulation after the delay period, they hydrate so that the microencapsulated cement particles, among other things, cure at least one void formed during the setting of the first cementitious component. In an exemplary embodiment, the delay period is at least a few hours to a few days after the bulk (e.g., at least over one half thereof) of the first cementitious component has hydrated.

In an exemplary embodiment, the second cementitious component should be present in the cement compositions of the present invention in a first cementitious component-to-second cementitious component weight ratio in the range of from about 50:50 to about 90:10. In an exemplary embodiment, the microencapsulated second cementitious material should be present in the cement compositions of the present invention in a first cementitious component-to-second cementitious component weight ratio in the range of from about 85:15 to about 90:10.

Optionally, in an exemplary embodiment, the second cementitious component may be combined with an expanding additive prior to microencapsulation, thereby allowing for the simultaneous microencapsulation of the expanding additive and the second cementitious component. In another exemplary embodiment, the cement compositions of the present invention optionally may comprise an expanding additive that has been microencapsulated in a coating of a degradable material using encapsulation techniques as discussed above for microencapsulation of the second cementitious component. Examples of suitable expanding additives include, but are not limited to, aluminum powder, gypsum blends, and deadburned magnesium oxide. Suitable examples of expanding additives are described in U.S. Pat. Nos. 4,304,298; 4,340,427; 4,367,093; 4,450,010 and 4,565,578, the disclosures of which are incorporated herein by reference. Exemplary expanding additives comprising aluminum powder are commercially available under the tradenames "GAS-CHEK®" additive and "SUPER CBL" from Halliburton Energy Services, Duncan, Okla. An exemplary expanding additive comprising a blend containing gypsum is commercially available under the tradename "MICROBOND" from Halliburton Energy Services, Duncan, Okla. Exemplary expanding additives comprising deadburned magnesium oxide are commercially available under the tradenames "MICROBOND M" and "MICROBOND HT" from Halliburton Energy Services, Duncan, Okla.

Furthermore, additional additives may be added to the cement compositions of the present invention as deemed appropriate by one skilled in the art, with the benefit of this disclosure. Examples of such additives include, inter alia, fly ash, silica compounds, fluid loss control additives, surfactants, dispersants, accelerators, retarders, salts, micas, fibers, formation conditioning agents, bentonite, microspheres, weighting materials, defoamers, and the like.

An example of a method of the present invention is a method of cementing in a subterranean formation penetrated by a well bore comprising the steps of: placing a cement composition into the well bore, wherein the cement composition comprises a first cementitious component having a first set time and a second cementitious component having a second set time this is delayed relative to the first set time of the first cementitious component; allowing the first cementitious component to at least partially set; and allowing the second cementitious component to set after a delay period.

Another example of a method of the present invention is a method of cementing in a subterranean formation penetrated by a well bore comprising the steps of: placing a cement composition into the well bore, wherein the cement composition comprises a first cementitious component having a first set time and a second cementitious component comprising microencapsulated cement particles, wherein the second cementitious component has a second set time that is delayed relative to the first set time of the first cementitious component; allowing the first cementitious component to at least partially set; and allowing the second cementitious component to set after a delay period.

Another example of a method of the present invention is a method of cementing an expandable tubular in a subterranean formation penetrated by a well bore comprising the steps of: placing the expandable tubular into the well bore; placing a cement composition into the well bore wherein the cement composition comprises a first cementitious component having a first set time, and a second cementitious component having a second set time that is delayed relative to the first set time of the first cementitious component; allowing the first cementitious component to at least partially set; expanding the expandable tubular; and allowing the second cementitious component to set after a delay period.

Another example of a method of the present invention is a method of cementing an expandable tubular in a subterranean formation penetrated by a well bore comprising the steps of: placing the expandable tubular into the well bore; placing a cement composition into the well bore wherein the cement composition comprises a first cementitious component having a first set time and a second cementitious component comprising microencapsulated cement particles, wherein the second cementitious component has a second set time that is delayed relative to the first set time of the first cementitious component; allowing the first cementitious component to at least partially set; expanding the expandable tubular; and allowing the second cementitious component to set after a delay period.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A method of cementing in a subterranean formation penetrated by a well bore comprising the steps of:
   placing a cement composition into the well bore, wherein the cement composition comprises a first cementitious component having a first set time and a second cementitious component having a set second set time that is delayed relative to the first set time of the first cementitious component;
   allowing the first cementitious component to at least partially set; and
   allowing the second cementitious component to set after a delay period.

2. The method of claim 1 wherein at least one void forms during the setting of the first cementitious component.

3. The method of claim 2 wherein at least one void is due to at least the use of an expandable tubular.

4. The method of claim 2 wherein second cementitious component sets so as to cure at least one void that forms during the setting of the first cementitious component.

5. The method of claim 1 wherein the second cementitious component will not begin to hydrate until after the delay period.

6. The method of claim 1 wherein the first cementitious component comprises a Portland cement, a pozzolanic cement, a gypsum cement, a high alumina content cement, a silica cement, a soil cement, a calcium phosphate cement, a high alkalinity cement, or mixtures thereof.

7. The method of claim 1 wherein the second cementitious component comprises microencapsulated cement particles.

8. The method of claim 7 wherein the microencapsulated cement particles comprise a Portland cement, a pozzolanic cement, a gypsum cement, a high alumina content cement, a silica cement, a soil cement, a calcium phosphate cement, a high alkalinity cement, or mixtures thereof.

9. The method of claim 7 wherein the microencapsulated cement particles comprise an expansive hydraulic cement.

10. The method of claim 7 wherein the microencapsulated cement particles comprise an ultra-fine particle size cement having particle size diameters not greater than about 30 microns.

11. The method of claim 7 wherein the microencapsulated cement particles comprise conventional particle size cement, fine particle size cement, ultra-fine particle size cement, or mixtures thereof.

12. The method of claim 7 wherein the microencapsulated cement particles are released into the cement composition after the delay period.

13. The method of claim 7 wherein the encapsulation of the second cementitious component involves at least one coating of a degradable material.

14. The method of claim 13 wherein the coating should not substantially degrade for at least six hours.

15. The method of claim 13 wherein the degradable material prevents incorporation of the microencapsulated cement particles into the cement composition until after the delay period.

16. The method of claim 13 wherein the degradable material is a degradable polymeric material.

17. The method of claim 13 wherein the degradable material comprises dextran, cellulose, a chitin, a chitosan, a liquid ester, a protein, an aliphatic polyester, a poly(lactide), a poly(glycolide), a poly($\epsilon$-caprolactone), a poly(hydroxybutyrate), a poly(anhydride), an aliphatic polycarbonate, an ortho ester, a poly(orthoesters), a poly(amino acid), a poly(ethylene oxide), or a polyphosphazene.

18. The method of claim 1 wherein the second cementitious component is present in the cement composition in a first cementitious component-to-second cementitious component weight ratio in the range of from about 50:50 to about 90:10.

19. The method of claim 1 wherein the cement composition further comprises an expanding additive that is microencapsulated in a coating of a degradable material.

20. The method of claim 19 further comprising the step of combining the expanding additive and second cementitious component prior to microencapsulation thereby allowing for the simultaneous microencapsulation of the expanding additive and the second cementitious component.

21. The method of claim 19 wherein the expanding additive comprises an aluminum powder, a gypsum blend, or a deadburned magnesium oxide.

22. The method of claim 1 wherein the cement composition further comprises fly ash, a silica compound, a fluid loss control additive, a surfactant, a dispersant, an accelerator, a retarder, salt, mica, fiber, a formation conditioning agent, bentonite, microspheres, a weighting material, or a defoamer.

23. A method of cementing in a subterranean formation penetrated by a well bore comprising the steps of:
   placing a cement composition into the well bore, wherein the cement composition comprises a first cementitious component having a first set time and a second cementitious component comprising microencapsulated cement particles, wherein the second cementitious component has a second set time that is delayed relative to the first set time of the first cementitious component;

allowing the first cementitious component to at least partially set having at least one void; and allowing the second cementitious component to set after a delay period so as to cure at least one void that forms during the setting of the first cementitious component.

24. The method of claim 23 wherein at least one void is due to at least the use of an expandable tubular.

25. The method of claim 23 wherein the second cementitious component will not begin to hydrate until after the delay period.

26. The method of claim 23 wherein the first cementitious component comprises a Portland cement, a pozzolanic cement, a gypsum cement, a high alumina content cement, a silica cement, a soil cement, a calcium phosphate cement, a high alkalinity cement, or mixtures thereof.

27. The method of claim 23 wherein the microencapsulated cement particles comprise a Portland cement, a pozzolanic cement, a gypsum cement, a high alumina content cement, a silica cement, a soil cement, a calcium phosphate cement, a high alkalinity cement, or mixtures thereof.

28. The method of claim 23 wherein the microencapsulated cement particles comprise an expansive hydraulic cement.

29. The method of claim 23 wherein the microencapsulated cement particles comprise an ultra-fine particle size cement having particle size diameters not greater than about 30 microns.

30. The method of claim 23 wherein the microencapsulated cement particles comprise conventional particle size cement, fine particle size cement, ultra-fine particle size cement, or mixtures thereof.

31. The method of claim 23 wherein the microencapsulated cement particles are released into the cement composition after the delay period.

32. The method of claim 23 wherein the encapsulation of the second cementitious component involves at least one coating of a degradable material.

33. The method of claim 32 wherein the coating should not substantially degrade for at least six hours.

34. The method of claim 32 wherein the degradable material prevents incorporation of the microencapsulated cement particles into the cement composition until after the delay period.

35. The method of claim 32 wherein the degradable material is a degradable polymeric material.

36. The method of claim 32 wherein the degradable material comprises dextran, cellulose, a chitin, a chitosan, a liquid ester, a protein, an aliphatic polyester, a poly(lactide), a poly(glycolide), a poly($\epsilon$-caprolactone), a poly(hydroxybutyrate), a poly(anhydride), an aliphatic polycarbonate, an ortho ester, a poly(orthoesters), a poly(amino acid), a poly(ethylene oxide), or a polyphosphazene.

37. The method of claim 23 wherein the second cementitious component is present in the cement composition in a first cementitious component-to-second cementitious component weight ratio in the range of from about 50:50 to about 90:10.

38. The method of claim 23 wherein the cement composition further comprises an expanding additive that is microencapsulated in a coating of a degradable material.

39. The method of claim 38 further comprising the step of combining the expanding additive and second cementitious component prior to microencapsulation thereby allowing for the simultaneous microencapsulation of the expanding additive and the second cementitious component.

40. The method of claim 38 wherein the expanding additive comprises an aluminum powder, a gypsum blend, or a deadburned magnesium oxide.

41. A method of cementing an expandable tubular in a subterranean formation penetrated by a well bore comprising the steps of:

placing the expandable tubular into the well bore;

placing a cement composition into the well bore wherein the cement composition comprises a first cementitious component having a first set time and a second cementitious component having a second set time that is delayed relative to the first set time of the first cementitious component;

allowing the first cementitious component to at least partially set;

expanding the expandable tubular; and allowing the second cementitious component to set after a delay period.

42. The method of claim 41 wherein at least one void forms during setting of the first cementitious component.

43. The method of claim 42 wherein second cementitious component sets so as to cure at least one void that forms during the setting of the first cementitious component.

44. The method of claim 41 wherein the second cementitious component will not begin to hydrate until after the delay period.

45. The method of claim 41 wherein the first cementitious component comprises a Portland cement, a pozzolanic cement, a gypsum cement, a high alumina content cement, a silica cement, a soil cement, a calcium phosphate cement, a high alkalinity cement, or mixtures thereof.

46. The method of claim 41 wherein the second cementitious component comprises microencapsulated cement particles.

47. The method of claim 46 wherein the microencapsulated cement particles comprise a Portland cement, a pozzolanic cement, a gypsum cement, a high alumina content cement, a silica cement, a soil cement, a calcium phosphate cement, a high alkalinity cement, or mixtures thereof.

48. The method of claim 46 wherein the microencapsulated cement particles comprise an expansive hydraulic cement.

49. The method of claim 46 wherein the microencapsulated cement particles comprise an ultra-fine particle size cement having particle size diameters not greater than about 30 microns.

50. The method of claim 46 wherein the microencapsulated cement particles comprise conventional particle size cement, fine particle size cement, ultra-fine particle size cement, or mixtures thereof.

51. The method of claim 46 wherein the microencapsulated cement particles are released into the cement composition after the delay period.

52. The method of claim 46 wherein the encapsulation of the second cementitious component involves at least one coating of a degradable material.

53. The method of claim 52 wherein the coating should not substantially degrade for at least six hours.

54. The method of claim 52 wherein the degradable material prevents incorporation of the microencapsulated cement particles into the cement composition until after the delay period.

55. The method of claim 52 wherein the degradable material is a degradable polymeric material.

56. The method of claim 52 wherein the degradable material comprises dextran, cellulose, a chitin, a chitosan, a liquid ester, a protein, an aliphatic polyester, a poly(lactide), a poly(glycolide), a poly(ε-caprolactone), a poly(hydroxybutyrate), a poly(anhydride), an aliphatic polycarbonate, an ortho ester, a poly(orthoesters), a poly(amino acid), a poly(ethylene oxide), or a polyphosphazene.

57. The method of claim 41 wherein the second cementitious component is present in the cement composition in a first cementitious component-to-second cementitious component weight ratio in the range of from about 50:50 to about 90:10.

58. The method of claim 41 wherein the cement composition further comprises an expanding additive that is microencapsulated in a coating of a degradable material.

59. The method of claim 58 further comprising the step of combining the expanding additive and second cementitious component prior to microencapsulation thereby allowing for the simultaneous microencapsulation of the expanding additive and the second cementitious component.

60. The method of claim 58 wherein the expanding additive comprises an aluminum powder, a gypsum blend, or a deadburned magnesium oxide.

61. The method of claim 41 wherein the cement composition further comprises fly ash, a silica compound, a fluid loss control additive, a surfactant, a dispersant, an accelerator, a retarder, salt, mica, fiber, a formation conditioning agent, bentonite, microspheres, a weighting material, or a defoamer.

62. A method of cementing an expandable tubular in a subterranean formation penetrated by a well bore comprising the steps of:
    placing the expandable tubular into the well bore;
    placing a cement composition into the well bore wherein the cement composition comprises a first cementitious component having a first set time and a second cementitious component comprising microencapsulated cement particles, wherein the second cementitious component has a second set time that is delayed relative to the first set time of the first cementitious component;
    allowing the first cementitious component to at least partially set having at least one void;
    expanding the expandable tubular; and
    allowing the second cementitious component to set after a delay period so as to cure at least one void that forms during the setting of the first cementitious component.

63. The method of claim 62 wherein the second cementitious component will not begin to hydrate until after the delay period.

64. The method of claim 62 wherein the first cementitious component a Portland cement, a pozzolanic cement, a gypsum cement, a high alumina content cement, a silica cement, a soil cement, a calcium phosphate cement, a high alkalinity cement, or mixtures thereof.

65. The method of claim 62 wherein the microencapsulated cement particles a Portland cement, a pozzolanic cement, a gypsum cement, a high alumina content cement, a silica cement, a soil cement, a calcium phosphate cement, a high alkalinity cement, or mixtures thereof.

66. The method of claim 62 wherein the microencapsulated cement particles comprise an expansive hydraulic cement.

67. The method of claim 62 wherein the microencapsulated cement particles comprise an ultra-fine particle size cement having particle size diameters not greater than about 30 microns.

68. The method of claim 62 wherein the microencapsulated cement particles comprise conventional particle size cement, fine particle size cement, ultra-fine particle size cement, or mixtures thereof.

69. The method of claim 62 wherein the microencapsulated cement particles are released into the cement composition after the delay period.

70. The method of claim 62 wherein the encapsulation of the second cementitious component involves at least one coating of a degradable material.

71. The method of claim 70 wherein the coating should not substantially degrade for at least six hours.

72. The method of claim 70 wherein the degradable material prevents incorporation of the microencapsulated cement particles into the cement composition until after the delay period.

73. The method of claim 70 wherein the degradable material is a degradable polymeric material.

74. The method of claim 73 wherein the degradable material comprises dextran, cellulose, a chitin, a chitosan, a liquid ester, a protein, an aliphatic polyester, a poly(lactide), a poly(glycolide), a poly(ε-caprolactone), a poly(hydroxybutyrate), a poly(anhydride), an aliphatic polycarbonate, an ortho ester, a poly(orthoesters), a poly(amino acid), a poly(ethylene oxide), or a polyphosphazene.

75. The method of claim 62 wherein the second cementitious component is present in the cement composition in a first cementitious component-to-second cementitious component weight ratio in the range of from about 50:50 to about 90:10.

76. The method of claim 62 wherein the cement composition further comprises an expanding additive that is microencapsulated in a coating of a degradable material.

77. The method of claim 76 further comprising the step of combining the expanding additive and second cementitious component prior to microencapsulation thereby allowing for the simultaneous microencapsulation of the expanding additive and the second cementitious component.

78. The method of claim 76 wherein the expanding additive comprises an aluminum powder, a gypsum blend, or a deadburned magnesium oxide.

\* \* \* \* \*